(12) United States Patent
Balarin (10) Patent No.: US 6,397,371 B1
(45) Date of Patent: May 28, 2002

(54) PROCEDURE FOR WORST-CASE ANALYSIS OF DISCRETE SYSTEMS

(75) Inventor: Felice Balarin, Berkeley, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 09/552,960

(22) Filed: Apr. 20, 2000

(51) Int. Cl.⁷ .............................................. G06F 17/50
(52) U.S. Cl. ................... 716/4; 716/5; 716/6
(58) Field of Search ................ 716/4, 5, 6, 1

(56) References Cited

U.S. PATENT DOCUMENTS

| | | | |
|---|---|---|---|
| 4,924,430 A | * 5/1990 | Zasio et al. | 364/578 |
| 5,493,508 A | * 2/1996 | Dangelo et al. | 364/489 |
| 5,600,576 A | 2/1997 | Broadwater et al. | 364/571.03 |
| 5,774,358 A | 6/1998 | Shrote | 364/191 |
| 5,910,897 A | * 6/1999 | Dangelo et al. | 364/488 |

OTHER PUBLICATIONS

Felice Balarin, "Automatic Abstraction for Worst–Case Analysis of Discrete Systems," IEEE, Mar. 2000, pp. 494–501.*

Felice Balarin, "worst–cast analysis of discrete systems," IEEE, Nov. 1999, pp. 347–352.*

Felice Balarin, "Worst–Case Analysis of Discrete Systems Based on Conditional Abstractions," IEEE, May 1999, pp. 115–119.*

Lim et al, "Specification and Verification of Real–Time Systems Using ACSR–VP," IEEE, Oct. 1997, pp. 135–142.*

Dharchoudhury et al, "Worst–Case Analysis and Optimization of VLSI Circuit Performances," IEEE, Apr. 1995, pp. 481–492.*

Lokanathan et al, "Efficient Worst Case Analysis of Integrated Circuits," IEEE, Apr. 1995, pp. 237–240.*

(List continued on next page.)

Primary Examiner—Vuthe Siek
(74) Attorney, Agent, or Firm—Crosby, Heafey, Roach & May (57) ABSTRACT

A general methodology for worst-case analysis of systems with discrete observable signals is disclosed. According to one embodiment, a signature σ is chosen and a σ-abstraction F is created, based on the system and the particular property to be analyzed. This procedure requires a user to facilitate the creation of an appropriate signature and σ-abstraction. Next, for a given length of time T, a signature s is determined. From the signature s the worst-case boundary conditions are determined. The methodology may also be applied to timing analysis of embedded systems implemented on a single processor. The procedure calculates a time T which is an upper bound on the time a processor can be busy (i.e. busy period). Thus, for the busy-period analysis, the time T is no longer fixed. As in the first embodiment, a signature σ is selected and a σ-abstraction F is created. A workload function R is chosen, and a signature s and time T are calculated. The calculated time T is an upper bound on the length of a busy period for the given system.

19 Claims, 5 Drawing Sheets

OTHER PUBLICATIONS

Audsley et al, "Life–Cycle Timing Analysis of IMA Systems," IEEE, Apr. 1998, pp. 7/1–7/5.*

Neil C. Audsley, Alan Burns, M. Richardson, Ken W. Tindell and Andy J. Wellings, "Applying New Scheduling Theory to Static Priority Pre–Emptive Scheduling," *Software Engineering Journal*, pp. 284–292, Sep. 1993.

Neil C. Audsley, Ken W. Tindell and Alan Burns, "The End of the Line For Static Cyclic Scheduling?" Proceedings of the 5th Euromicro Workshop on Real–Time Systems, pp. 36–41, Oulu, Finland, 1993.

Felice Balarin, "Priority Assignment for Embedded Reactive Real–Time Systems," Submitted to the 1998 ACM SIGPLAN Workshop on Languages, Compilers, and Tools for Embedded Systems, Montreal, CA, Jun. 19–20, 1998.

Felice Balarin, Karl Petty, Alberto L. Sangiovanni–Vincentelli and Pravin Varaiya, "Formal Verification of the PATHO Real–Time Operating System," In Proceedings of 33rd Conference on Decision and Control, CDC'94, Dec. 1994.

Felice Balarin and Alberto Sangiovanni–Vincentelli, "Schedule Validation for Embedded Reactive Real–Time Systems," In Proceedings of the 34th ACM/IEEE Design Automation Conference, Jun. 1997.

Jin–Young Choi, Insup Lee, and Hong–Liang Xie, "The Specification and Schedulability Analysis of Real–Time Systems Using ACSR," In Proceedings of IEEE Real–Time Systems Symposium, pp. 266–275, IEEE Computer Society Press, Dec. 1995.

Michael Gonzalez Harbour, Mark H. Klein, and John Lehoczky, "Timing Analysis for Fixed–Priority Scheduling of Hard Real–Time Systems," *IEEE Transaction on Software Engineering*, 20(1), Jan. 1994.

C. L. Liu and James W. Layland, "Scheduling Algorithms for Multiprogramming in a Hard–Realtime Environment," *Journal of the Association for Computing Machinery*, 20(1):46–61, Jan. 1973.

P. McGeer, A. Saldanha, R. Brayton, and A. Sangiovanni–Vincentelli, "Delay Models and Exact Timing Analysis," In T. Sasao, editor, *Logic Synthesis and Optimization*. Kluwer Academic Publishers, 1993.

Milzner, K. et al. (Mar. 1991) "SILAS: A Knowledge–Based Simulation Assistant" *IEEE Journal of Solid–State Circuits* 26(3):310–318.

* cited by examiner

```
      module CONTROL { frame Type frames[5]; integer last := 0;
1         if( present( message )) {
2             frames := value( message );
3             last := size( value( message)); }
4         if( (present( play ) || present( request ) && last > 0 ) {
5             emit frame( frames[ last - -] ) ; } } module BUFFER { sample Type samples[50]; integer last := 0;
6         if( present( frame )) {
7             samples := value( frame );
8             last := 50; }
9         if( present( tick ) && last > 0 ) ) {
10            emit speaker( samples[ last - -] ) ;
11            if(last = 20)) {
12                emit request(); } } }
```

| environment | CONTROL | BUFFER |
|---|---|---|
| $F_{pl} = \left\lfloor \dfrac{T}{500} \right\rfloor + 1$ | $F_{fr} = \min\left(pl + rq + 1, \sum_{i=1}^{5} f_i\right)$ | $F_{rq} = \min\left(fr, \left\lfloor \dfrac{tk}{30} \right\rfloor\right) + 1$ |
| $F_{ms} = \left\lfloor \dfrac{T}{200} \right\rfloor + 1$ | $F_{f_5} = \min(pl + rq, ms) + 1$ | $F_{sp} = \min(tk + 1, 50 * (fr + 1))$ |
| $F_{th} = \left\lfloor \dfrac{T}{100} \right\rfloor + 1$ | $F_{f_i} = \min(pl + rq, f_{i+1}) + 1$<br>for i = 1, ..., 4 | |

PROCEDURE FOR WORST-CASE ANALYSIS OF DISCRETE SYSTEMS

BACKGROUND OF THE INVENTION

1. Field of the Invention

The present invention relates generally to the field of embedded system verification, and more particularly, to a general methodology for worst-case and busy period analysis of systems having discrete observable signals.

2. Description of the Related Art

Embedded systems are becoming more complex, and controlling ever more critical processes. It is thus not surprising that significant research efforts have emerged for developing methodologies to efficiently design such systems. Because the various embedded environments often impose strict limitations, verification of embedded systems must not be limited to their functionality, but must also include constraints such as timing performance, and power consumption.

Embedded system verification is difficult, especially for software code, because system responses need to be checked for all legal behaviors of the environment. Typically, there are infinitely many such behaviors. Even when the problem is reduced by formal reasoning to enumerating finitely many internal system states, the number of such states is usually still computationally prohibitive. Using abstractions and implicit state enumeration can simplify the problem, but complete formal verification is at best at the performance limit of existing computers (and often far beyond).

Presently, the most widely used approach to verification of embedded systems is simulation. This approach has an obvious weakness in that only a few of the infinitely many input patterns can be tried, and thus complete verification can never be guaranteed. An alternative approach is the worst-case analysis methodology, where the system response is analyzed only for those behaviors of the environment that are the hardest for the system to execute. Worst-case analysis is a well known engineering method, but so far it has been used ad-hoc, with separate techniques for specific system properties. Furthermore, there is currently no systematic methodology for performing worst-case analysis of software.

Another technique that is used is prototyping. In prototyping, a physical model of a system is built consisting typically of a chosen microprocessor (or micro-controller), memory and some interface circuitry. The prototype is then exercised with some set of input sequences, and the outputs of the system are monitored for correctness. Both simulation and prototyping have the common problem that there are infinitely many possible input sequences, so even if a system behaves correctly for all sequences in the test set, there still is no guarantee that the system will behave correctly for a different input sequence. In other words, using these prior methods, it can be shown that a system does not meet a given constraint, but it can never be proven that the system does in fact meet the constraint.

Busy-period analysis can be expressed as a standard verification problem in a formalism that combines timing information with finite-state systems. For example, Balarin B et.al., Formal Verification of the PATHO real-time operating system, Proceedings of the 33rd Conference on Decision and Control, CDC '94, December 1994, herein incorporated by reference, formulated this problem as a reachability problem for timed automata. Choi et.al., The Specification and Schedulability Analysis of Real-Time Systems Using ACSR, Proceedings of EEEE Real-Time Systems Symposium, pages 266–275, EEE Computer Society Press, December 1995, herein incorporated by reference, formulated the problem as an equivalence checking problem in a process algebra ACSR-VP. Both of these approaches have the advantage of being exact, but they both suffer from severe limitations due to the computational complexity involved. Thus, it is highly unlikely that these approaches could ever be applied to practical systems of realistic size.

There are also well established algorithms for timing analysis of combinational logic circuits, as disclosed in for example McGeer et al., Delay Models and Exact Timing Analysis, Logic Synthesis and Optimization, T. Sasao, editor, Kluwar Academic Publishers, 1993, herein incorporated by reference. Like reactive real-time systems, combinational logic circuits also consist of interacting components (gates), but unlike gates which can propagate the signals concurrently, only one software task can execute at a time on a given processor. This significant difference makes combinational logic circuits an unsuitable model for reactive real-time systems.

In a data-flow graph model, a system consists of actors, which take items of data from their inputs and produce items of data on their output. The actors can act only if data items are present on all of their inputs. This feature enables very predictable scheduling of actors (and thus simple timing analysis). It is now widely accepted that because of this feature, data-flow graphs are well suited to model data-intensive systems (e.g. those appearing in signal processing), but not well suited for reactive control-dominated systems where a reaction is required for many different conditions in the environment.

A variety of verification models have been considered over the past several decades by researchers in the real-time systems community. Most of the models are extensions or modifications of the one introduced by Liu and Layland, Scheduling Algorithms for Multiprogramming in a Hard-Realtime Environment, Journal of the Association for Computing Machinery, 20(1):46–61, January 1973, herein incorporated by reference. These models have considered systems in which all the tasks are independent (i.e. no precedence or exclusion constraints), periodic, and occurring for the first time at time zero.

The restrictions on this model have been somewhat relaxed by later researchers, although several significant limitations are still present in all the previous approaches:

The processing time requirements of a component is assumed to be constant.

An execution of a component is assumed to cause executions of all of its successors, while in reality a component may be enabling only some successors, depending on the inputs and internal states.

Previous approaches are restricted to acyclic system graphs, i.e. to systems for which there exists a well defined unidirectional information flow.

Previous approaches are applicable only to systems with static priority scheduling.

Therefore, there is a need for an improved procedure for verification of embedded systems.

SUMMARY OF THE INVENTION

The present invention is a general methodology for worst-case and busy period analysis of systems with discrete observable signals. Most embedded systems, as well as many others, fit into this category. The methodology can be used to verify different properties of systems such as power consumption, timing performance, or resource utilization. The busy period analysis determines the maximum length of time a processor can be busy. The present methods are conservative, i.e. the system is guaranteed to perform within the bounds computed by the methodology, but these bounds are not necessarily the best possible.

According to this first embodiment of the present method, a signature σ is chosen and a σ-abstraction F is created, based on the system and the particular property to be analyzed. This procedure requires a user to facilitate the creation of an appropriate signature and σ-abstraction. Next, for a given length of time T, a worst-case signature s is determined. From the signature s the worst-case boundary conditions are determined.

The present invention may also be applied to timing analysis of embedded systems implemented on a single processor. Timing analysis of embedded software system can be divided into two sub-problems: local and global. The local sub-problem is to determine processing time requirements for a piece of code implementing a single component of the system. The global sub-problem is to determine response time of the system given processing time requirements of system components and taking into account that response to some requests may be delayed by responses to other requests. The present invention addresses only the global sub-problem and assumes that a solution to the local sub-problem is available.

The procedure calculates a time T which is an upper bound on the time a processor can be busy (i.e. busy period). Thus, for the busy-period analysis, the time T is no longer fixed. As in the first embodiment, a signature σ is selected and a σ-abstraction F is created. A workload function R is chosen, and a signature s and time T are calculated. The calculated time T is an upper bound on the length of a busy period for the given system.

These and other aspects of the invention, as well as further details of specific embodiments, may be more fully understood from the following specification and drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The following description is provided to enable any person skilled in the art to make and use the invention and sets forth the best modes contemplated by the inventor for carrying out the invention. Various modifications, however, will remain readily apparent to those skilled in the art, since the basic principles of the present invention have been defined herein specifically to provide a procedure for worst-case and busy period analysis of discrete systems. Any and all such modifications, equivalents and alternatives are intended to fall within the spirit and scope of the present invention, as defined by the appended claims.

The present invention is a general methodology for worst-case analysis of systems with discrete observable signals. Most embedded systems, as well as many others, fit into this category. The methodology can be used to verify different properties of systems such as power consumption, timing performance, or resource utilization. It is also conservative—the system is guaranteed to perform within the bounds computed by the methodology, but these bounds are not necessarily the best possible.

The present invention may also be applied to timing analysis of embedded systems implemented on a single processor. Timing analysis of embedded software system can be divided into two sub-problems: local and global. The local sub-problem is to determine processing time requirements for a piece of code implementing a single component of the system. The global sub-problem is to determine response time of the system given processing time requirements of system components and taking into account that response to some requests may be delayed by responses to other requests. The present invention addresses only the global sub-problem and assumes that a solution to the local sub-problem is available.

In order to describe the present invention, a simple voice mail pager system will be used as an example. The operation of the voice mail pager 10 will now be described with reference to FIG. 1. The pager 10 receives external messages 12 from the environment. Each message consists of up to five frames, and each frame contains fifty samples. The CONTROL module 12 stores messages internally (in variable frames) and initiates playing of the most recent message (by generating the frame event), upon a user's request (by generating the play event). The CONTROL module 12 may also generate a frame if any are available and the BUFFER module 14 makes a request. The BUFFER module 14 starts playing the message after it receives the initial frame from the CONTROL module 12. A message is played by sending one sample per every tick of the real-time clock to the speaker. When there are fewer than 20 samples left to play, the BUFFER module 14 sends a request for the next frame to the CONTROL module 12.

Systems

A simple and general formal notion of systems will now be introduced. A system is a set of executions. An execution x of length len(x) is a mapping from the interval of real numbers [0, len(x)] to some set of signal values such that: x is piecewise-constant with only finitely many discontinuities, i.e. the value of x may change only finitely many times in [0, len(x)]. It is required that all executions in a system range over the same set of signal values. In fact, it is assumed that all executions described herein range over the same set, so that it does not need to be specifically specified. For example, for the pager of FIG. 1, signal Values may be state variables and communication events. According to the present approach, instead of manipulating executions directly, abstractions called signatures are used.

Given an execution x and real numbers u, t such that $0 \leq u \leq t \leq \text{len}(x)$, $x[u, t]$ is used to denote an execution of length t−u defined by:

$$x[u, t](v) = x(u+v).$$

If, in addition, u>0, x[u, t]⁻ is used to denote $$x[u-\epsilon, t-\epsilon],$$

where $\epsilon>0$ is small enough that x is constant in [u−ε, u) and [t−ε, t). Since x has only finitely many discontinuities, such a choice of ε is always possible.

Signatures

Formally, signature σ is a mapping from the set of executions to some set of signature values $D_\sigma$ for which some partial order≦ is defined, such that for all u, t satisfying $0\leq u\leq t\leq len(x)$:
1. σ(x[u, t])≦σ(x)
2. σ(x[u, t])=σ(x) if the value of x does not change in [0, u] and [t, len(x)].

Intuitively, a signature represents a summary of activities in an execution. This intuition is consistent with the constraints placed on σ. a full execution should contain more activities than its portion (condition 1), and the activity summary should not change if an execution is extended with passive (i.e. constant) segments (condition 2).

Figure 1:
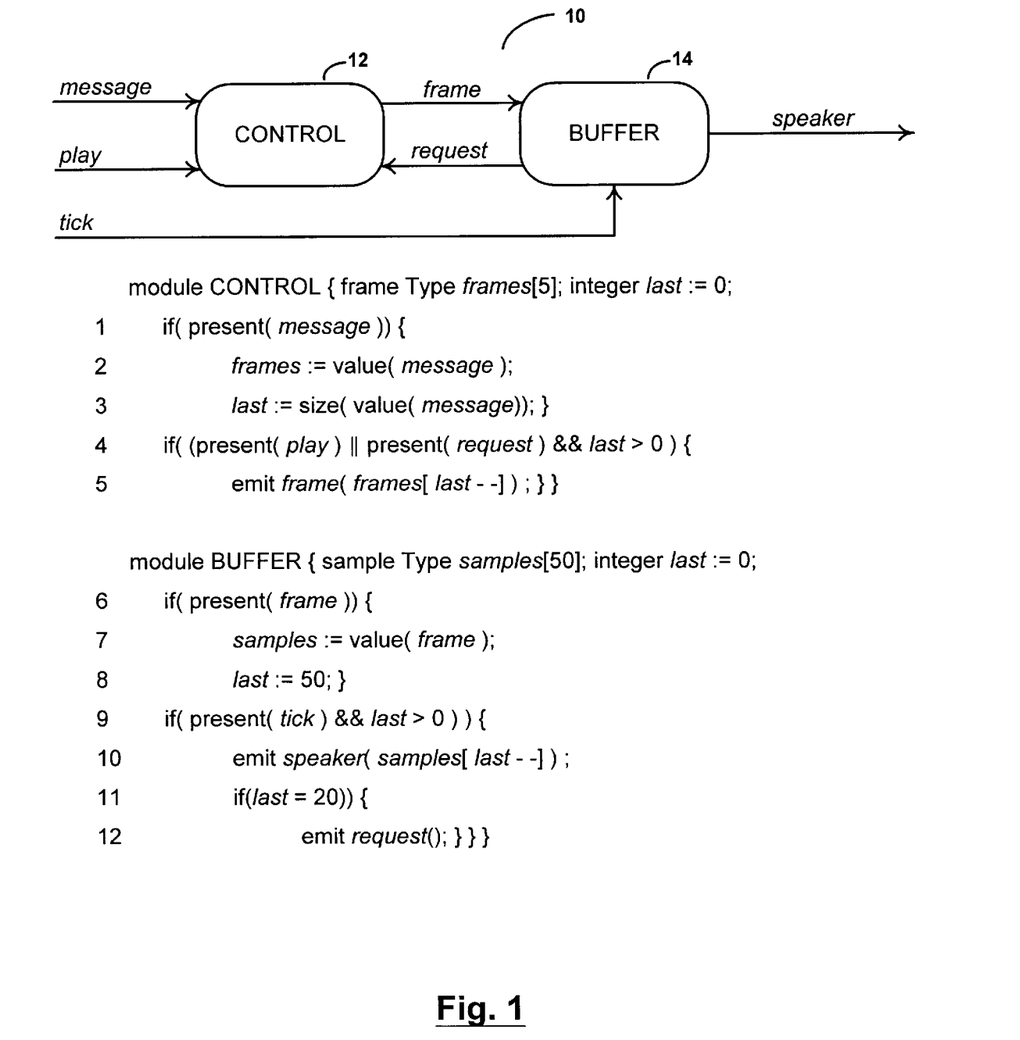
FIG. 1 is an example of a voice-mail pager system, with a description of the behaviors of the components.

For the pager 10 in FIG. 1, consider the signature represented by the following vector of variables:

$$(pl, ms, tk, fr, f_1, \ldots, f_5, rq, sp).$$

Figure 2:
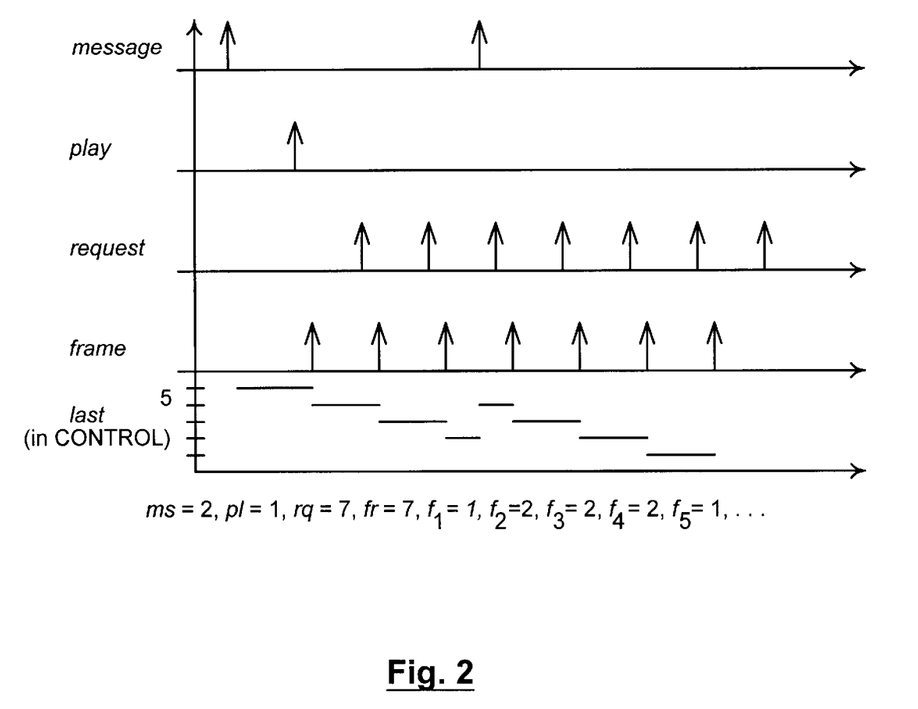
FIG. 2 illustrates a component of an execution and its signature.

For a given execution, a variable pl is chosen to hold the number of occurrences of the play event in that execution. Variables ms, tk, fr, rq, and sp correspond similarly to events message, tick, frame, request, and speaker respectively. The rest of the variables abstract the state of the CONTROL module 12. For some i between 1 and 5, variable $f_i$ holds the number of times line 4 in FIG. 1 is executed with variable last having value i. FIG. 2 shows a component of an execution corresponding to the CONTROL module 12 and its corresponding signature.

By definition, signature values must be partially ordered. In this case, the present invention uses a natural extension of the relation≦(on reals) to vectors: two vector are related by≦if and only if all their components are related. The presently defined choice of a signature is a compromise between two conflicting requirements. On one hand, for efficiency reasons, a signature should be as simple as possible, i.e. containing as little information as possible. On the other hand, a signature should contain information about the inputs and the states of a module that is sufficient to compute (or at least reasonable bound) the signature of module outputs. This is discussed in further detail below with regards to signature-based abstractions of systems to bound the worst-case behavior.

Signature Based Abstractions

Signatures provide abstract representation of signals in the system. Next, an abstract representation of the system transition function is defined.

Given some system S, signature σ and some function $F:D_\sigma \times IR^+ \to D_\sigma$ then F is a σ-abstraction of S, if F is:
monotone: if $T_1 \leq T_2$ and $s_1 \leq s_2$ then $F(s_1, T_1) \leq F(s_2, T_2)$, and
future-bounding: for every execution x∈S and every u, t:

$$\sigma(x[u, t]) \leq F(\sigma(x[u, t]), t-u).$$

Figure 3:
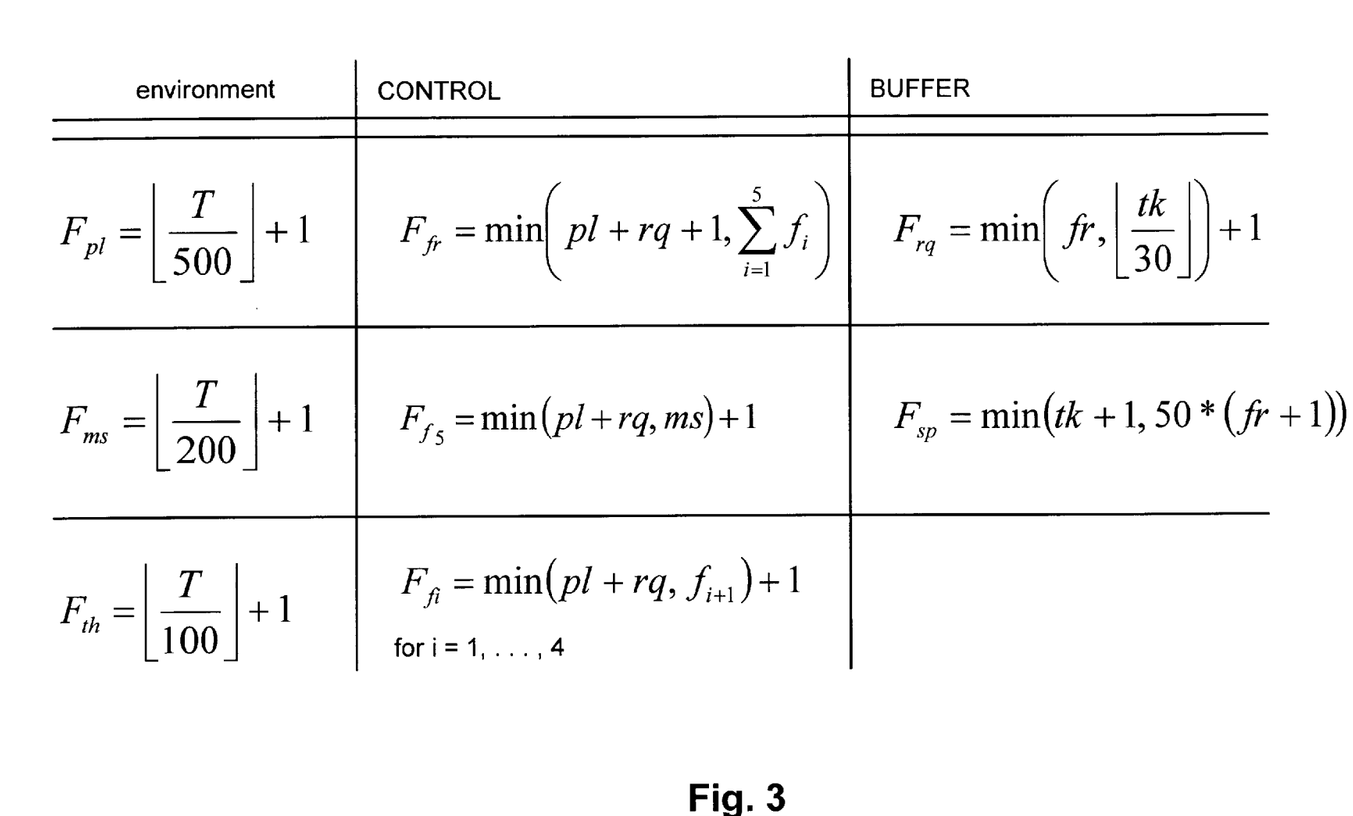
FIG. 3 is a table showing the σ-abstraction of the pager of FIG. 1.

Consider, for example, the pager 10 in FIG. 1 and the signature σ discussed in the previous section. A abstraction of the pager is shown in FIG. 3. The σ-abstraction consists of a separate function for each variable in the signature. The variables can be divided into three groups: those generated by the environment, those generated by the CONTROL module 12, and those generated by the BUFFER module 14. The σ-abstraction of the environmental variables depends only on time and not on other signature variables. The present invention uses a very simple model, where the only constraint is a minimum time between two occurrences of the event. These times are 100, 200, and 500 time units for tick, message and play events, respectively. Therefore, the maximum number of tick (message, play) events in an execution segment of length T is $$\left\lfloor \frac{T}{100} \right\rfloor + 1 \left( \left\lfloor \frac{T}{200} \right\rfloor + 1, \left\lfloor \frac{T}{500} \right\rfloor + 1 \right),$$

respectively.

In contrast to variables generated by the environment, σ-abstractions of other variables depend only on signatures, and not on time. This is often the case for parts of signatures modeling software modules. Since it is hard to predict their timing, software modules are usually programmed in a way that has no direct notion of time. Instead, information about time comes indirectly, e.g. through events generated by the timer module implemented in hardware.

Expressions in FIG. 3 for the σ-abstractions of the CONTROL module 12 and the BUFFER module 14 variables are derived from the code in FIG. 1. For example, the BUFFER module 14 generates a request event 30 tick events after it receives a frame. Thus, in the interval containing fr frame events and tk tick events, the BUFFER module 14 can generate at most min $$\left( fr, \left\lfloor \frac{tk}{30} \right\rfloor \right)$$

request events, except possibly an extra one at the beginning of the interval. Similarly, the CONTROL module 12 can generate a frame event only if line 5 in FIG. 1 is executed with a value of last between 1 and 5. Therefore, fr is bounded by $$\sum_{i=1}^{5} f_i.$$

On the other hand, except at the beginning, the CONTROL module 12 can generate a frame event only if it receives a play or a request event. Therefore, fr is also bounded by pl+req+1. Other bounds in FIG. 3 are derived by similar reasoning.

Two applications of the present invention will now be described. The first one is for general worst-case analysis of discrete systems, and the second application (called busy-period analysis) is for timing analysis of single-processor systems.

Worst-case Analysis

The problem of the worst-case analysis of a system S with a signature σ and σ-abstraction F is the following:
For a given interval length T, find a signature value s such as $s \leq \sigma(x[t, t+T])$ for every execution x∈S, and every t∈[0, len(x)−T].

In other words, s must be worse than the signature of any execution segment of length T. Such information can help answer many important questions in the design process. For example, if the signature contains information about bus requests, then the worst-case analysis indicates required average bus bandwidth for a period of time of length T. Similarly, if the signature contains information about energy required for an execution, then the worst-case analysis gives a bound of the average power for any interval of time of length T. The worst-case analysis can also be used to analyze timing performance of the system, as discussed below.

There are two cornerstones of the worst-case analysis: partial ordering of signatures, and the future-bounding property of the σ-abstraction. Partial ordering of signatures enables the ranking of executions, allowing the consideration of only "bad" ones. Intuitively, larger signatures correspond to executions with more activities, which usually represent more demanding cases for the system.

The future-bounding property of σ-abstractions is used to compute such a worst-case signature. First, it is established that the worst-case signature is a bound on an initial segment of an execution, and then the future-bounding property is used to show that it remains the bound for any execution segment. This argument applies if the worst-case signature is also a fix-point of the σ-abstraction. If the signature of some execution segment is less than a fix-point of the σ-abstraction, then the future-bounding property assures that the signature of the segment in the immediate future is also less than the fix-point. This reasoning is formalized by the following result:

Proposition 1 Let σ and F be a signature and a σ-abstraction of some system S. If x∈S, s ∈$D_σ$, and T≧0 are such that s=F(s,T) and σ(x[0,0])≦s, then:

$$\sigma(x[t, t+T]) \leq s \;\; \forall t \in [0, \text{len}(x)-T].$$

Figure 4:
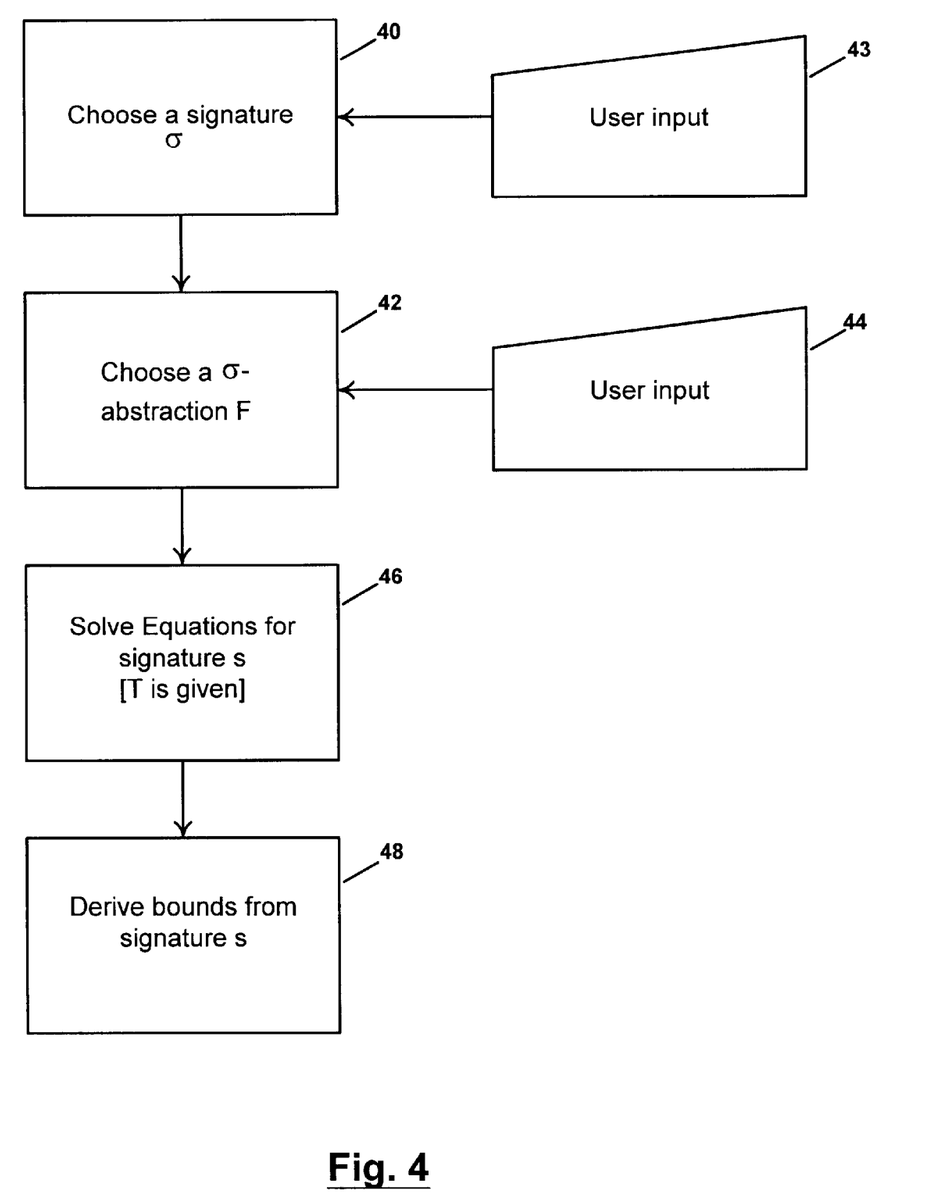
FIG. 4 is a flowchart of the procedure of the present invention for worst-case analysis.

Based on Proposition 1, the following is the procedure for the worst-case analysis of discrete systems, as illustrated in FIG. 4:

1. choose a signature σ, (step 40)
2. choose a σ-abstraction F and verify that it is monotone and future-bounding, (step 42, 44)
3. for a given length of time T, find a signature s such that s=F(s, T) and σ(x[0,0])≦s for all executions x∈S, (step 46)
4. derive from s bounds on interesting quality measures of the system. (step 48)

Choosing appropriate signatures and σ-abstractions is an art that requires understanding both the system and the property to be analyzed. The selection of a signature σ and a σ-abstraction F requires user input 43, 44, based upon the system and property under evaluation. Checking the future-bounding property is a typical verification problem: i.e. it amounts to checking whether a detailed "implementation" (in this case the system) satisfies a more abstract "specification" (σ-abstraction). Usual formal and informal verification approaches can thus be used. For example, one may devise a monitor which computes signatures during system simulations and warns a user if a future-bounding property has been violated.

Solving the fix-point equation in step 3 is typically quite simple, and may be solved using an iterative solution method described below. The final step of the worst-case analysis is interpreting the computed worst-case signatures. If the signature abstraction is chosen carefully, then the worst-case signatures will contain enough information for the designer to determine bounds on many important quality measures of the design. Three have been specifically mentioned: bus utilization (i.e. I/O bandwidth), power consumption, and timing performance, but other interesting properties may be analyzed as well.

Busy-period Analysis

The worst-case analysis procedure may be applied to bound the response time of a software system implemented on a single processor. More precisely, the busy period is bounded, i.e. longest period of time a processor can be busy. A bound on a busy period is also a bound on the response time, under a reasonable assumption that the processor cannot be idle if there are pending requests.

Given some execution x and some u, t such that 0≦u≦t≦len(x), [u, t] is a busy period of x if the processor is busy at each time v∈[u, t]. The busy period [u, t] of x is initialized if there does not exist any v<u such that [v, t] is a busy period of x.

To compute a bound on busy periods, information about the processing time requirements is needed. This information is provided by a workload function. The processing time requirements depend on events in the environment. Therefore, the workload function should depend on an execution. However, to enable worst-case analysis, the present invention only considers an abstraction which depends on a signature.

Formally, for a given system S and signature σ, we say that R:$D_σ$→IR is a workload function: if it is:

monotone: if $s_1 \leq s_2$ then $R(s_1) < R(s_2)$, and workload-bounding for every execution x, and every initialized busy period [u, t] in x:

$$R(\sigma(x[u, t])) > t-u.$$

The workload-bounding property ensures that approximate processing time requirements given by a workload function is a strict upper bound on the actual processing time requirements which determines the length of a busy period.

For example, assume that the execution time of each executable line in FIG. 1 is 10 time units. Also, assume the signature described above . Then, a workload function for the pager 10 might be:

$$R=20*(pl+rq+ms)+20*ms+10*fr+20*fr+tk)+20*fr+20*sp+10*rq.$$

The first line in the equation corresponds to the CONTROL module 12, while the second line corresponds to the BUFFER module 14. The workload function is valid under the following conditions:

At the beginning of an initialized busy period, modules start executing from the entry point. For example, the first time the CONTROL module 12 gets the processor in any initialized busy period, it should be executing line 1 of FIG. 1.

A module is not executed unless there are some fresh events at its inputs. For example, the condition implies that the CONTROL module 12 is executed at most pl+rq+ms times. Each execution will require at least 20 time units for two if statements, hence the term 20*(Pl+rq+ms) in the workload function.

The term 20*ms in the workload function is due to lines 2 and 3 of FIG. 1, which will be executed only if a new message is received. Similarly, the number of executions of line 5 is the same the number of generated frame events (hence the term 10*fr). The terms in the equation corresponding to the BUFFER module 14 were obtained by a similar analysis.

The workload functions and σ-abstractions can be combined to bound the length of busy periods. Let T be the length of some initialized busy period. According to Proposition 1, its signature is bounded by s such that s=F(s,T). It follows that the required processing in that busy period, and therefore also T, is bounded by R(s). More formally:

Proposition 2 Let σ, F, and R be a signature, an σ-abstraction, and a workload function of some system S. If s∈D_σ, and T≧0 are such that:

s=F(s,T),
T=R(s)
σ(x[0,0])≦s for all executions x∈S, then T is an upper bound on the length of busy periods of all executions x∈S.

Figure 5:
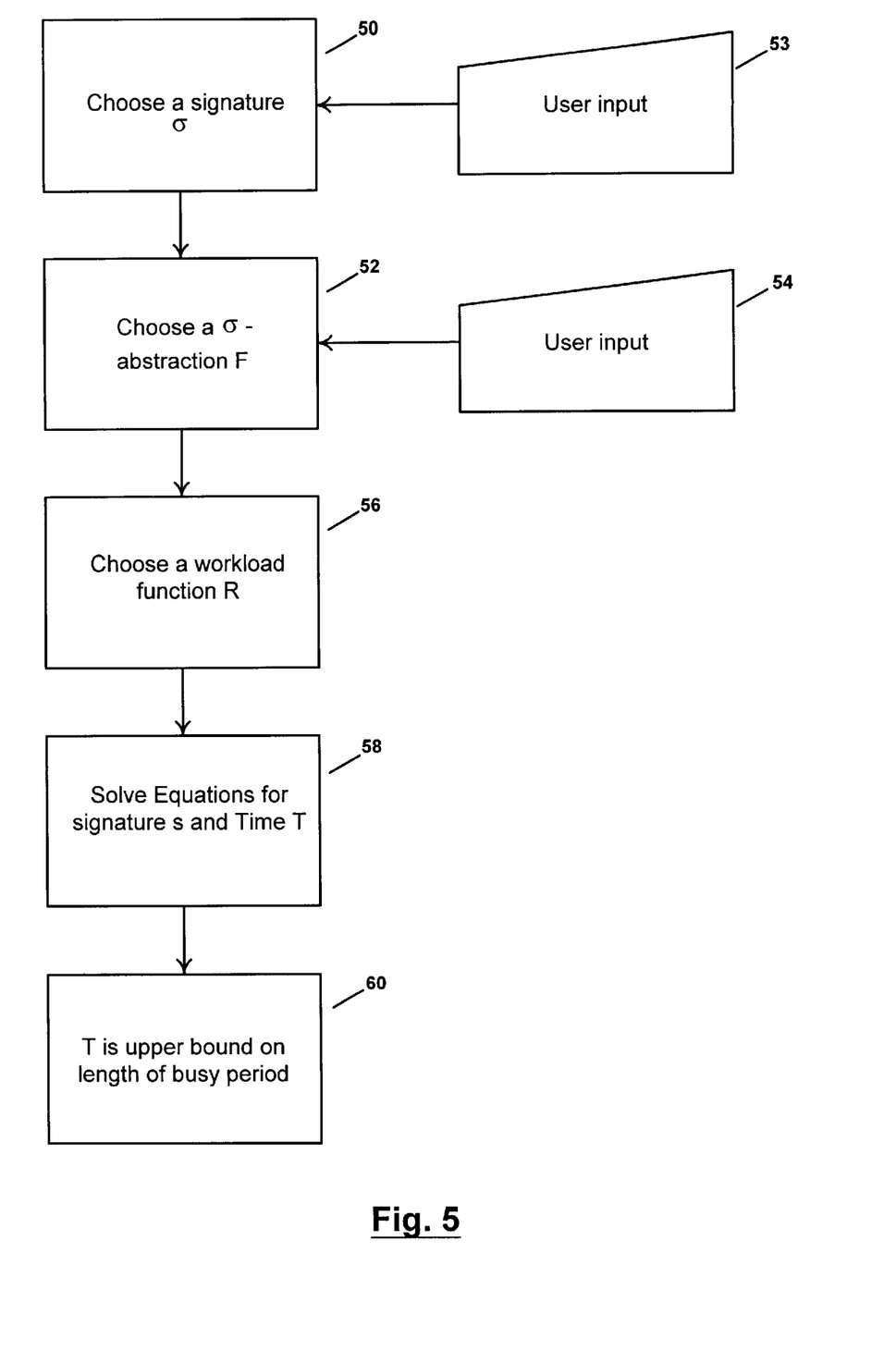
FIG. 5 is a flowchart of the procedure of the present invention for busy period analysis.

Based on Proposition 2, the following procedure for busy-period analysis of discrete systems may be applied, as illustrated in FIG. 5:

1. Choose a signature σ (step 50)
2. choose a σ-abstraction F and verify that it is monotone and future-bounding, (step 52, 54)
3. choose a workload function R and show that it is monotone and workload-bounding, (step 56); the workload function R is a signature which specifies how much processor time is needed to process input s;
4. find a signature s and time T such that s=F(s,T), T=R(s), and σ(x[0,0])≦s for all executions x∈S, (step 58)
5. conclude that T is an upper bound on the length of a busy period. (step 60)

To solve fix-point equations in step 4, s=F(s,T), T=R(s), the following simple iterative algorithm may be used:

1. let T:=0, let s be such that s≧x[0,0] for all executions x,
2. let s:=F(s,T), let T:=R(s),
3. repeat step 2 until convergence or until T≧$T_{MAX}$, where $T_{MAX}$ is a user-given bound. It is reasonable to ask for such a bound, because most systems usually have some minimal performance requirements. If the bound is known to be higher than this minimal requirement, there is little point in wasting resources in determining exactly how unacceptable the performance actually is. (A similar procedure may be used for solving for s in the worst-case analysis).

Since F and R are monotone, s and T can only increase from iteration to iteration. However, the algorithm may not terminate if T converges to some value less than $T_{MAX}$, and s keeps increasing beyond any bounds. This situation may be eliminated by requiring that R be strictly monotone (i.e., if $s_1 < s_2$, then $R(s_1) < R(s_2)$). This is a natural requirement, since "more" inputs typically require more processing time.

It may appear that step 1 requires a search over a potentially infinite space of executions. In fact, in most cases it is quite simple to determine an initial s. For example, for g the pager 10 in FIG. 1 it suffices to let s=F(0,0). The pager is representative of a large class of systems where:

system components cannot react in zero time and thus in x[0,0] all components are in some of the known initial states, and the environment may produce some initial events in x[0,0], but they can be easily bounded by evaluating the σ-abstraction for a time interval of length 0.

The present method requires almost no assumption about the scheduling algorithm used to control the processor access for system components. However, if some information about the scheduling is known it can be used to improve accuracy of the analysis. For example, if a preemptive static priority scheduling scheme is used, the analysis can be extended to p-busy-period analysis: to bound the interval of time a processor is continuously busy executing at priority level p or higher. Essentially, p-busy-period analysis is just a regular busy-period analysis that ignores all components with priority less than p. A bound on a p-busy period is a better bound on response time for requests at priority p.

Another way to use scheduling information is to improve σ-abstractions and workload functions. For example, if the BUFFER module 14 in FIG. 1 is scheduled once per every tick event, the workload function can be improved by replacing the terms 20*(fr+tk) and 20*fr with 20*tk and 20*max(fr, tk) respectively.

In contrast to some of the prior art solutions, if a constraint is shown to be valid by the present method, then the constraint is met for any input sequence. Because the present method is conservative, no conclusions can be made if a proven bound does not meet the target. In this way, simulation and prototyping and the proposed method are complementary verification methods: the former can be used to prove the violation of a constraint, while the latter can be used to prove satisfaction. Furthermore, the present invention allows processing time requirements and enabled successors to be a function of the inputs and internal states, and is applicable to systems with cyclic system graphs and various scheduling schemas. In other words, unlike prior art systems, the present approach allows the execution time to depend on the system inputs, providing a more realistic analysis model.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method for worst-case analysis of a system having discrete observable signals, the method comprising:

choosing a signature σ for a desired system timing parameter;

choosing a σ-abstraction F, and verifying that F is monotone and future-bounding;

determining, for a given length of time T, a signature s;

deriving from the signature s bounds on the desired system timing parameter of the system; and utilizing the bounds to verify proper operation of the system.

2. The method of claim 1, wherein for a system S,

If x∈S, s∈D_σ, and T≧0 are such that s=F(s,T) and σ(x[0,0])≦s, then:

$$\sigma(x[t, t+T]) \leq s \; \forall t \in [0, len(x)-T].$$

3. The method of claim 2, wherein s is determined by solving:

s=F(s,T) and σ([0,0])≦s for all executions x∈S.

4. The method of claim 3, wherein the σ-abstraction F is selected by a user based upon desired the system S and the desired system parameter.

5. The method of claim 4, wherein s is determined by an iterative procedure.

6. The method of claim 5 wherein the desired system parameter is bus utilization or power consumption, instead of timing.

7. The method of claim 1, wherein an execution time of the system depends on system inputs.

8. A method for determining a bound on a processor busy period, wherein an execution time depends on inputs, the method comprising:

choosing a signature σ, choosing a σ-abstraction F, and verifying that F is monotone and future-bounding, choosing a workload function R and verifying that R is monotone and workload-bounding, determining a signature s and a time T, wherein T is an upper bound on the length of a busy period, and utilizing the upper bound T to verify proper operation of the process.

9. The method of claim 8, wherein for a system S,

If $s \in D_o$, and $T \geq 0$ are such that:

$s=F(s,T)$, $T=R(s)$ $\sigma(x[0,0]) \leq s$ for all executions $x \in S$, then T is an upper bound on the length of busy periods of all executions $x \in S$.

10. The method of claim 9, wherein s and T are determined by solving:

$s=F(s,T)$, $T=R(s)$, and $\sigma(x[0,0]) \leq s$ for all executions $x \in S$.

11. The method of claim 10, wherein the $\sigma$-abstraction F is selected by a user based upon desired the system S.

12. The method of claim 11, wherein s is determined by an iterative procedure.

13. The method of claim 12, wherein the iterative procedure comprises:

a. let T:=0, let s be such that $s \geq x[0,0]$ for all executions x, b. let s:=F(s,T), let T:=R(s), c. repeat step b until convergence or until $T \geq T_{MAX}$, where $T_{MAX}$ is a user-given bound.

14. The method of claim 8, wherein the processor is not idle if there are pending requests.

15. A method for verification of a system having discrete observable signals, wherein an execution time of the system depends on system inputs, the method comprising:

choosing a signature for a desired system parameter, wherein the system parameter comprises one of the timing performance, bus utilization and power consumption;

choosing a $\sigma$-abstraction F, and verifying that F is monotone and future-bounding;

determining, for a given length of time T, a signature s, wherein s is determined by solving:

$s=F(s,T)$ and $\sigma(x[0,0]) \leq s$ for all executions $x \in S$;

deriving from the signature s bounds on the desired system parameter of the system.

16. A method for determining a bound on a processor busy period, wherein the processor is not idle if there are pending requests and an execution time depends on inputs, the method comprising:

choosing a signature $\sigma$, choosing a $\sigma$-abstraction F, and verifying that F is monotone and future-bounding, choosing a workload function R and verifying that R is monotone and workload-bounding, determining a signature s and a time T, T being an upper bound on the length of a busy period, wherein s and T are determined by solving:

$s=F(s,T)$, $T=R(s)$, and $\sigma(x[0,0]) \leq s$ for all executions $x \in S$; and utilizing the upper bound T to verify proper operation of the processor.

17. A computer readable medium including computer program code for verification of embedded systems, said computer readable medium comprising:

computer program code for choosing a signature $\sigma$ for a desired system timing parameter;

computer program code for choosing a $\sigma$-abstraction F, and verifying that F is monotone and future-bounding;

computer program code for determining, for a given length of time T, a signature s;

computer program code for deriving from the signature s, bounds on the desired system timing parameter of the system; and computer program code for utilizing the bounds to verify proper operation of the system.

18. The computer readable medium of claim 17, wherein the desired system parameter is bus utilization or power consumption, instead of timing.

19. A computer readable medium including computer program code for determining a bound on a processor busy period, wherein an execution time depends on inputs, said computer readable medium comprising:

computer program code for choosing a signature $\sigma$, computer program code for choosing a $\sigma$-abstraction F, and verifying that F is monotone and future-bounding;

computer program code for choosing a workload function R and verifying that R is monotone and workload-bounding, computer program code for determining a signature s and a time T, wherein T is an upper bound on the length of a busy period; and computer program code for utilizing the upper bound T to verify proper operation of the processor.

* * * * *